(12) United States Patent
Moyer

(10) Patent No.: US 8,949,835 B2
(45) Date of Patent: Feb. 3, 2015

(54) YIELDING INPUT/OUTPUT SCHEDULER TO INCREASE OVERALL SYSTEM THROUGHPUT

(75) Inventor: Jeffrey E. Moyer, Carlisle, MA (US)

(73) Assignee: Red Hat, Inc., Raleigh, NC (US)

( * ) Notice: Subject to any disclaimer, the term of this patent is extended or adjusted under 35 U.S.C. 154(b) by 418 days.

(21) Appl. No.: 12/956,898

(22) Filed: Nov. 30, 2010

(65) Prior Publication Data

US 2012/0137299 A1    May 31, 2012

(51) Int. Cl.
G06F 9/46    (2006.01)
G06F 9/48    (2006.01)
G06F 3/06    (2006.01)

(52) U.S. Cl.
CPC ............ *G06F 9/4881* (2013.01); *G06F 3/0613* (2013.01); *G06F 3/0659* (2013.01); *G06F 3/0676* (2013.01)
USPC ............................ 718/102; 718/104; 718/106

(58) Field of Classification Search
CPC ... G06F 3/0613; G06F 3/0676; G06F 3/0659; G06F 9/4881
USPC .......................................... 718/102, 103, 104
See application file for complete search history.

(56) References Cited

U.S. PATENT DOCUMENTS

| | | | |
|---|---|---|---|
| 6,757,897 B1 * | 6/2004 | Shi et al. | 718/102 |
| 7,165,252 B1 * | 1/2007 | Xu | 718/102 |
| 7,712,104 B2 * | 5/2010 | Sekiguchi et al. | 718/102 |
| 7,886,297 B2 * | 2/2011 | Nagano et al. | 718/101 |
| 7,908,604 B2 * | 3/2011 | Takayama et al. | 718/101 |
| 8,156,499 B2 * | 4/2012 | Foulger et al. | 718/102 |
| 8,341,374 B2 * | 12/2012 | Kwon et al. | 711/167 |
| 2005/0283785 A1 * | 12/2005 | D'Souza | 718/100 |
| 2007/0220517 A1 * | 9/2007 | Lippett | 718/102 |
| 2009/0013323 A1 * | 1/2009 | May et al. | 718/104 |
| 2009/0031310 A1 * | 1/2009 | Lev et al. | 718/101 |
| 2012/0102242 A1 * | 4/2012 | Koren et al. | 710/36 |

\* cited by examiner

*Primary Examiner* — Meng An
*Assistant Examiner* — Abu Ghaffari
(74) *Attorney, Agent, or Firm* — Lowenstein Sandler LLP

(57) ABSTRACT

A mechanism for yielding input/output scheduler to increase overall system throughput is described. A method of embodiments of the invention includes initiating a first process issuing a first input/output (I/O) operation. The first process is initiated by a first I/O scheduling entity running on a computer system. The method further includes yielding, in response to a yield call made by the first I/O scheduling entity, an I/O scheduler to a second I/O scheduling entity to initiate a second process issuing a second I/O operation to complete a transaction including the first and second processes, and committing the transaction to a storage device coupled to the computer system.

15 Claims, 4 Drawing Sheets

YIELDING INPUT/OUTPUT SCHEDULER TO INCREASE OVERALL SYSTEM THROUGHPUT

TECHNICAL FIELD

The embodiments of the invention relate generally to input/output scheduling and, more specifically, relate for a mechanism to yield input/output scheduler to increase overall system throughput.

BACKGROUND

Input/output (I/O) scheduling represents a method by which an operating system decides the order by which block I/O operations are submitted to a storage medium. One such I/O scheduling is referred to as Completely Fair Queuing (CFQ) which serves as an I/O scheduler for Linux® kernel. For example, one I/O scheduling technique may place synchronous requests submitted by processes into a number of per-process queues and then allocate timeslices for each of the queues to access the disk. The technique allows a process queue to idle at the end of synchronous I/Os to anticipate a closer I/O from that process. Although this queuing-based I/O scheduling technique maintains optimal order in which I/O operations are submitted to a storage device, the technique can penalize I/O processes which require coordination between multiple scheduling entities, such as when a subsequent scheduling entity is needed to issue a dependent I/O before the original I/O process initiated by the previous scheduling entity can be satisfied.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for yielding input/output scheduler to increase overall system throughput. A method of embodiments of the invention includes initiating a first process issuing a first input/output (I/O) operation. The first process is initiated by a first I/O scheduling entity running on a computer system. The method further includes yielding, in response to a yield call made by the first I/O scheduling entity, an I/O scheduler to a second I/O scheduling entity to initiate a second process issuing a second I/O operation to complete a transaction including the first and second processes, and committing the transaction to a storage device coupled to the computer system.

In one embodiment, a yield mechanism is provided to facilitate a first scheduling entity to voluntarily yield I/O scheduler to a second scheduling entity to perform a dependent task using the time and resources relinquished by the first scheduling entity. This yielding technique is used to codify dependencies or context switching between the first and second scheduling entities to streamline a typical I/O scheduling process. Context switching or dependencies are involved when multiple scheduling entities are needed to issue their relevant I/O operations to complete a transaction and commit it to a storage device. In one embodiment, the yield mechanism is used to improve system throughput by eliminating scheduling waiting periods, long queues, and idle windows (e.g., an 8 ms idle window by default). System throughput refers to an average rate at which I/O processes are completed and measured in bytes or, more often, megabytes per second.

Figure 1:
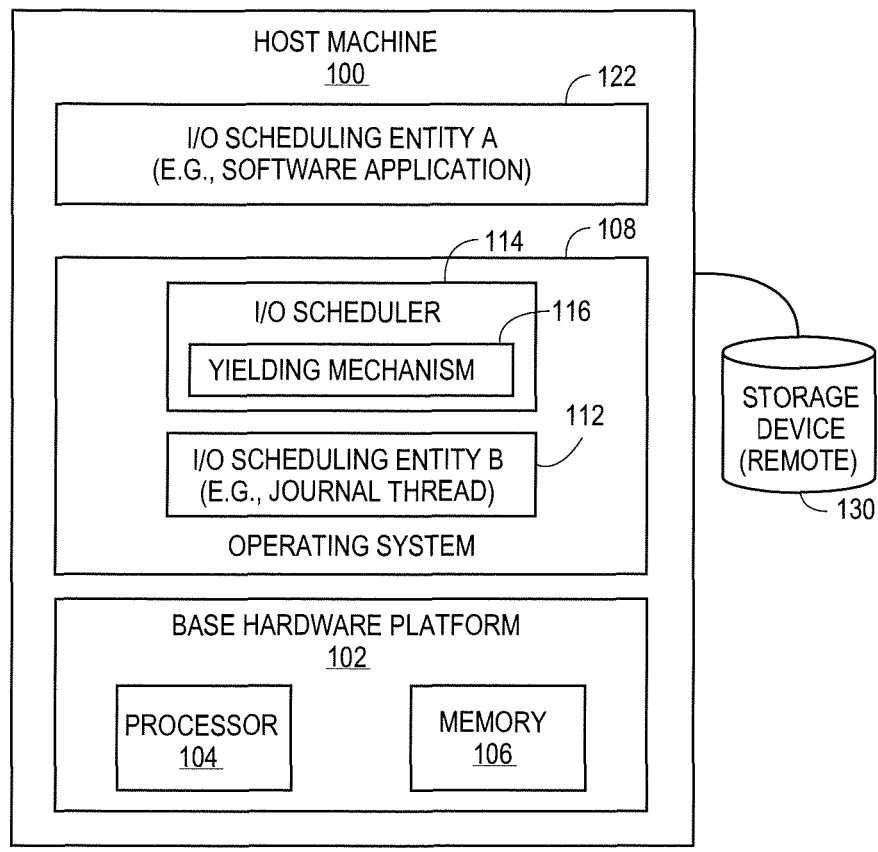
FIG. 1 illustrates a host machine employing yield mechanism according to one embodiment of the invention.

FIG. 1 illustrates a host machine 100 employing yielding mechanism 116 according to one embodiment of the invention. Host machine 100 includes a base hardware platform 102 that comprises a computing platform, which may be capable, for example, of working with a standard operating system 108. Operating system 108 serves as an interface between any hardware or physical resources of the host machine 100 and a user. In some embodiments, base hardware platform 102 may include a processor 104, memory devices 106, network devices, drivers, and so on. Host machine 100 may include a server computing system or a client computing system. Further, terms like "machine", "device", "computer", and "computing system" are used interchangeably and synonymously throughout this document.

In one embodiment, the operating system 108 hosts an I/O scheduler 114 having the yielding mechanism 116 and I/O scheduling entity B 112 ("entity B") (e.g., journal thread). Host machine 122 employs I/O scheduling entity A 122 ("entity A") (e.g., software application program). Entity A 122 includes, for example, a software application that initiates an I/O process that issues an entity A I/O operation (e.g., write I/O) along with a commitment function (e.g., fsync) to send the dirty pages down to the I/O scheduler 114 to commit the I/O transaction relating to the I/O process to a storage device 130 (e.g., storage disk) employed on or in communication with the host machine 100. In one embodiment, the I/O process may require another scheduling entity, such as entity B 112, to perform its task and issue its own I/O operation before the I/O process initiated by entity A 122 can be released and the transaction can be completed and then committed to the storage device 130.

Entity B 112, for example, includes a journal thread to perform certain dependent tasks (e.g., added metadata) relating to the I/O process initiated by entity A and issues an entity B I/O operation (e.g., journal I/O). This yielding of the I/O scheduler 114 to entity B 112 is part of the fsync operation issued by entity A 122 because without the fsync call, the I/O process initiated by entity A 122 would be completed to the page cache. In one embodiment, yielding mechanism 116 triggers entity A 122 to issue a yield call (e.g., yield_io_scheduler) to the I/O scheduler 114 to facilitate the journal thread of entity B 112 to immediately issue the journal I/O in context of the entity A I/O process and the write I/O, while charging the time used to the entity A I/O process, i.e., while using the time and resources relinquished by entity A 122 and without having the need to: (1) schedule in, for example, entity B 112 to issue its entity B 110, (2) wait until the end of a number of idle windows, or (3) schedule in other I/O processes before entity B 112 can be used. An idle window refers to an idle time period in I/O processing where the I/O scheduler 114 awaits further I/O requests from the currently scheduled entity, until such a time as the idle window expires or another entity preempts the currently scheduled entity. In the illustrated case, for example, without the yielding mechanism 116, entity B 112 would have to be scheduled in and suffered idle windows due to the I/O scheduler 114 waiting in anticipation of entity A 122 issuing more I/Os; however, using the yielding mechanism 116, in one embodiment, entity A 122 yields the I/O scheduler 114 to entity B 112 to issue an entity B I/O to complete the entity A process as well as the transaction which is then stored at storage device 130. In one embodiment, it is in response to an fsync call by entity A 122 that a yield, log_start_commit and log_wait_commit are performed. I/O scheduler 114 is yielded by entity A 122 to entity B 112 on entity A's time, e.g., entity A 122 relinquishes its resources (e.g., its allocated time with the I/O scheduler 114) to entity B 112 which then uses the relinquished resources to perform its tasks. In short, process A by entity A 122 includes fsync, yield_io_scheduler, log_start_commit, and log_wait_commit (which puts process A to sleep), while process B by entity B 112 includes begin journal activity, issue I/O to I/O scheduler 114, and when completion is signaled, wake up caller of log_wait_commit. Furthermore, results are propagated and provided, via a system call return code, to the software application calling these functions.

For example, a mail server application gets entity A 122 assigned to it by the I/O scheduler 114. When a mail server receives a mail message, it may not acknowledge that receipt to the sender without first persisting the message to a stable storage. The mail server application may achieve this by first creating a new file on a file system for the message and then performing a number of writes to this file, the content of which is the full message as received by the mail server application, and then performing an fsync on the file descriptor associated with the file in order to ensure the message is persisted on stable storage. The writes from the mail server application to the file are completed to the operating system's page cache in host memory. When the fsync call is made, the data is copied from the page cache to the stable storage. In the case of a journaling file system, a journal transaction is to be created to update metadata, and that transaction is then committed to the storage device 130. The two I/O scheduling entities involved in this process include the I/O scheduling entity A 122, assigned to the mail server application by the I/O scheduler 114, and a second I/O scheduling entity B 112, assigned to the journaling thread by the I/O scheduler 114. Further, upon calling fsync, the data in the page cache is then submitted to the I/O scheduler 114 in the context of the I/O scheduling entity A 122. For an ext3 file, an fsync code path may wait until all of the data I/O is completed before creating a journal transaction. The creation of a journal transaction happens in the context of the journaling thread. Therefore, the journaling thread is to be triggered so it may create a new transaction, and commit that transaction to the storage device 130.

Now, a rotational magnetic storage typically refers to a disk, hard disk, disk drive, or simply storage. A typical hard disk is made up of a series of one or more magnetic platters that rotate at a fixed rate and one or more heads are used to read from and write to the platter surfaces. Positioning of the heads is referred to as seeking. For each device manufactured, there is a calculated and advertised average seek rate. For most consumer grade hard disks, the average seek rate is 8 milliseconds ("ms"). Thus, sequential I/Os (e.g., I/Os for which the heads have to move very little) tend to perform very well, but other I/O that require frequent repositioning of the heads tend to perform relatively slowly. One task of the I/O scheduler 114 is to provide good overall system throughput when dealing with multiple and independent streams of application I/Os, and one way for achieving this is to recognize sequential I/O patterns, and allow an application that is issuing such patterns to continue to issue I/Os, instead of interleaving its I/Os with other applications and thus, incurring the high seek penalties. Looking next at application I/O patterns, it is common to have dependent reads. This is a situation where an application may have a single buffer and that buffer is read into, incrementally. For example, it first reads N bytes of data from a given file into its buffer and at this point, some processing may (or may not) be performed before another N bytes of data is read. Conventionally, an idle window in CFQ is set, for example, at 8 ms, which also happens to be the common average seek time for hard disks. By idling for applications that issue dependent reads, less seeks are needed to perform the same amount of I/O.

The same logic applies if those writes happen to be synchronous, meaning they are generated by an fsync call, or a file descriptor to which the I/O is being performed is opened with O_SYNC or O_DSYNC. Getting back to the aforementioned mail server example, when the mail server application issued an fsync call, the I/O generated was synchronous write I/O. Since the application was creating a new file, which is laid out sequentially, meaning that the idling logic of CFQ may get triggered, which means after issuing all write I/Os, CFQ would continue to idle, expecting that the mail server application would issue additional I/Os related to the previous I/O. In this example, however, the mail server application does not issue any more I/Os until the journal thread commits the transaction. Thus, in one embodiment, using the yielding mechanism 116, by allowing the fsync code path in the file system, the I/O scheduler 114 is explicitly yielded to the journaling thread of entity B 112, which means the idle window timeout (e.g., 8 ms) is elided, thus improving overall disk throughput.

Figure 2:
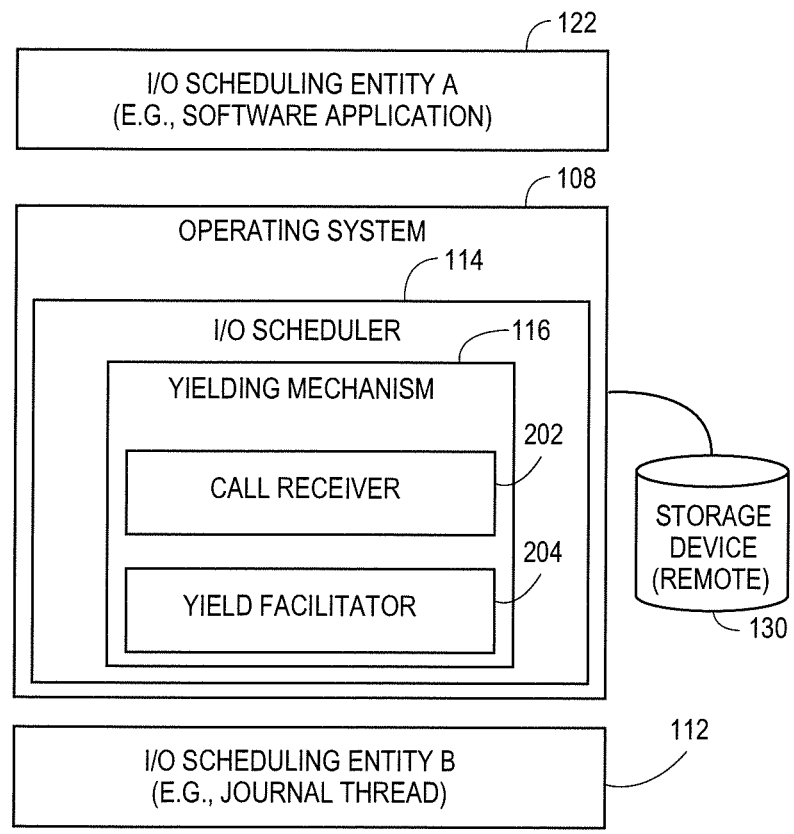
FIG. 2 illustrates yield mechanism according to one embodiment of the invention.

FIG. 2 illustrates yielding mechanism 116 according to one embodiment of the invention. In one embodiment, yielding mechanism 116 includes a call receiver 202 to receive various function calls (e.g., fsync, log_start_commit, log_wait_commit), such as a function yield call (e.g., yield_io_scheduler) to trigger yield facilitator 204 to facilitate yielding of I/O scheduler 114 to have scheduling entity B 112 perform its dependent tasks while charging the time to the entity A I/O process and the I/O scheduling entity A 122.

For example, an I/O operation, such as a write system call (e.g., write I/O), is issued by a process initiated by entity A 122 (e.g., software application) on a file descriptor of a file (e.g., ext3 file) that is opened using, for example, the O_SYNC flag. The write request is submitted (e.g., ending up in a page cache of a host machine) followed by a kernel-internal fsync call for the range of the file affected by the I/O write. The fsync call is used to send the dirty pages down to the I/O scheduler 114 to, for example, help commit the completed transaction relating to the process to the storage device 130, which is performed when the write I/O is completed. In case of context switching or entity dependency, the entity A process and its issued I/O operation depend on entity B 112 to perform certain tasks and issue its own I/O operation to release the entity A process and commit the entire transaction to the storage device 130.

In the illustrated embodiment, entity B 112 includes a journal thread to issue its I/O operation (e.g., journal I/O) to allow the entity A process to be released and the fsync call completed for the transaction to be stored at the storage device 130. In one embodiment, before a start function (e.g., log_start_commit) to start entity B 112 can be issued by entity A 122, a yield function call (e.g., yield_io_scheduler) is issued by entity A 122 and received at the call receiver 202 of the yielding mechanism 116. In response to the yield function call being placed by entity A 122, the I/O scheduler 114 yields itself to entity B 112 whose journal thread is facilitated, via yield facilitator 204, to issue a relevant journal I/O in the context of the aforementioned entity A process that has issued the write I/O. In one embodiment, the journal I/O is issued immediately by entity B 112, eliminating the conventional queue processes and idle windows that are needed to schedule in other processes before, for example, the journal thread 112 could issue its journal I/O. For example, as aforementioned, conventionally, the journal I/O would have not have been immediately issued because of the I/O scheduler 114, waiting for the time slice of entity A 122 to expire, and potentially waiting for other scheduling entities before being scheduled in; however, using the yielding mechanism 116, in one embodiment, since entity A 122 relinquishes its time with the I/O scheduler 114 to yield the I/O scheduler 114 to entity B 112 to issue its entity B I/O (e.g., journal I/O), entity B 122 does not have to go through queue processes or idle windows and issues an entity B I/O that is needed to complete the entity A process and complete the transaction which is then stored at the storage device 130.

Further, in one embodiment, any time and resources consumed by entity B 122 in issuing the entity B I/O operation are charged to the process (e.g., entity A process) that invoked it. Stated differently, entity A 122 relinquishes its own time and resources when it issues the yield function call to call upon the I/O scheduler 114 to yield and invoke (journal thread) entity B 112 to issue the relevant (journal) I/O operation. In the illustrated embodiment, once the journal I/O is issued by the journal thread 112, the transaction involving the process is completed and then stored at the storage device 130 as a commit function routine is received at the call receiver 202 and invoked. . In one embodiment, various function calls (e.g., yield_io_scheduler, fsync, log_wait_commit, log_wait_commit, etc.) are received and processed at the call receiver 202, while the yield facilitator 204 is used to yield the I/O scheduler 114 in response to a yield function call, as aforementioned. Furthermore, results are propagated and provided, via a system call return code, to the software application calling these functions.

Figure 3:
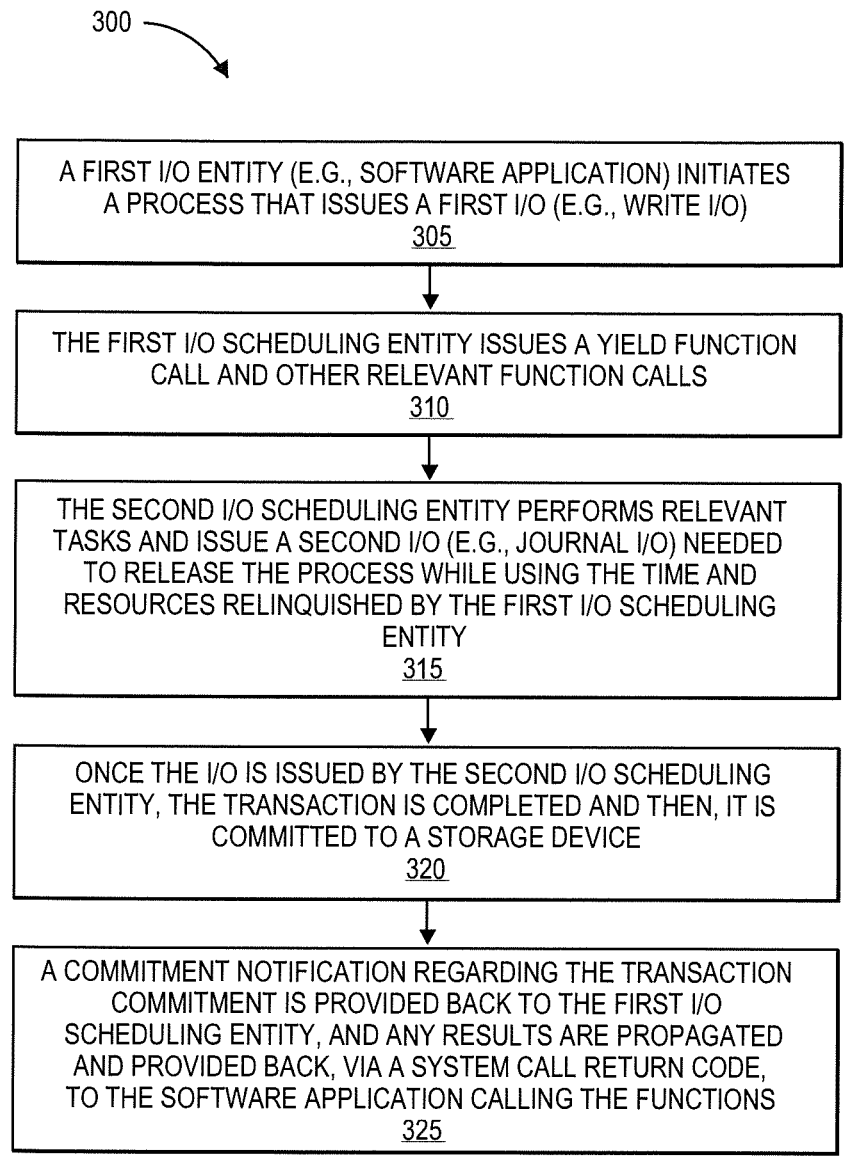
FIG. 3 illustrates a method for yielding an I/O scheduler according to one embodiment of the invention.

FIG. 3 illustrates a method for yielding an I/O scheduler according to one embodiment of the invention. Method 300 may be performed by processing logic that may comprise hardware (e.g., circuitry, dedicated logic, programmable logic, microcode, etc.), software (such as instructions run on a processing device), or a combination thereof, such as firmware or functional circuitry within hardware devices. In one embodiment, method 300 is performed by yield mechanism of FIG. 1.

Method 300 starts with an I/O operating (e.g., write I/O) being issued by a process that is part of a transaction initiated by a first I/O scheduling entity at block 305. At block 310, the first I/O scheduling entity issues a yield function call and other relevant function calls, causing yielding of an I/O scheduler to a second I/O scheduling entity. The first I/O scheduling entity calls the yielding of the I/O scheduler by relinquishing its own time and resources so that the I/O scheduler may be yield to the second I/O scheduling entity to issue its own I/O. At block 320, the second I/O scheduling entity performs relevant tasks and issues its own I/O operation (e.g., journal I/O) using the resources relinquished by the first I/O scheduling entity. At block 325, once the I/O operation is issued by the second I/O scheduling entity, the transaction is completed and then committed to a storage device. At block 330, a commitment notification regarding the commitment of the transaction to the storage device is provided back to the first I/O scheduling entity and any results are propagated and provided back, via a system call return code, to the software application calling the functions.

Figure 4:
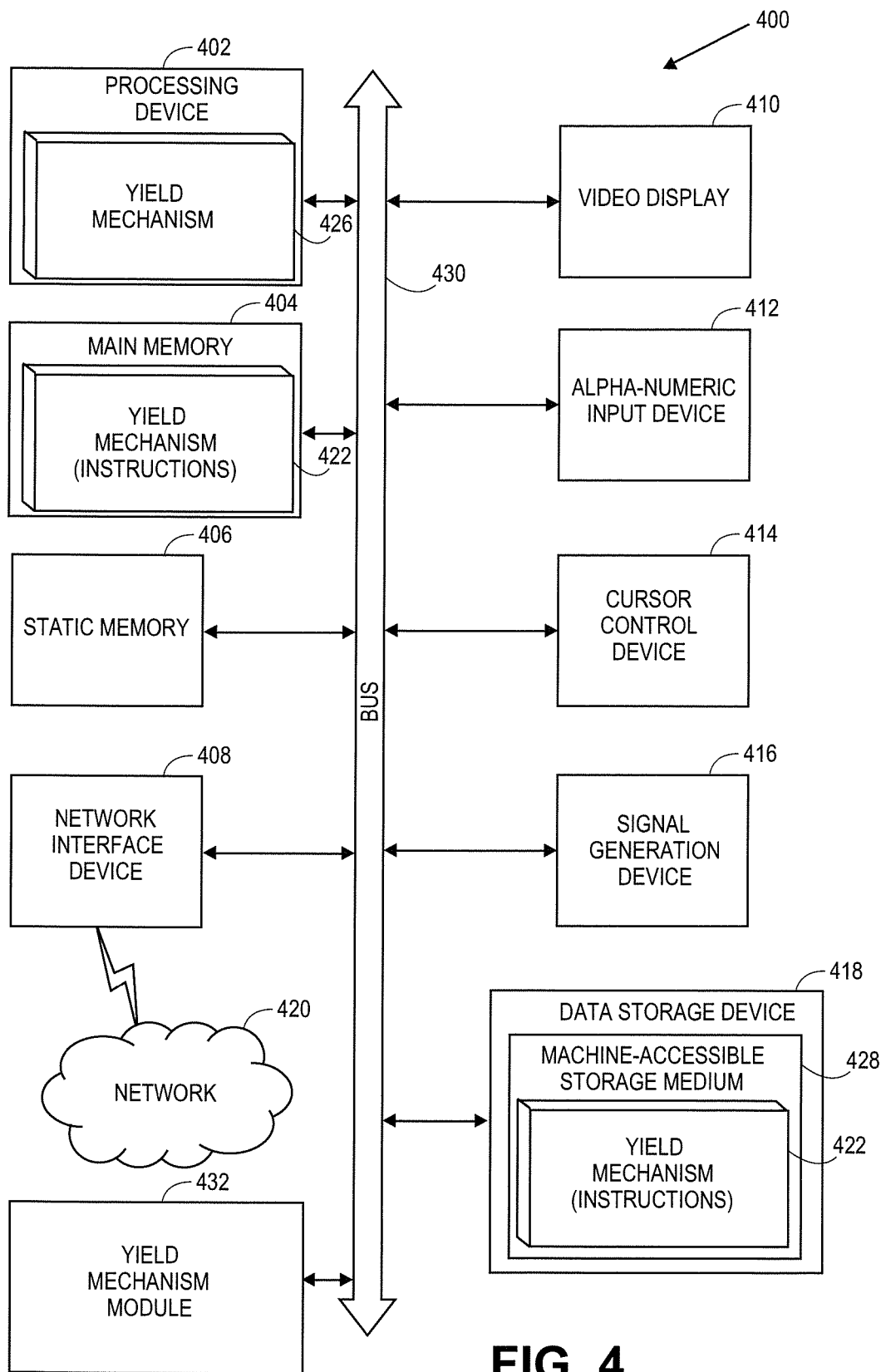
FIG. 4 illustrates a computing system according to one embodiment of the invention.

FIG. 4 illustrates a computing system 400 employing a yield mechanism according to one embodiment of the invention. Within the computing system 400 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computing system 400 includes a processing device 402, a main memory 404 (e.g., read-only memory (ROM), flash memory, RAM, dynamic RAM (DRAM) such as synchronous DRAM (SDRAM), DRAM (RDRAM), etc.), a static memory 406 (e.g., flash memory, static random access memory (SRAM), etc.), and a secondary memory 418 (e.g., a data storage device in the form of a drive unit, which may include fixed or removable machine-accessible or computer-readable storage medium), which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 402 is configured to execute the processing logic 426 for performing the operations and methods discussed herein.

The computing system 400 may further include a network interface device 408. The computing system 400 also may include a video display unit 410 (e.g., a liquid crystal display (LCD) or a cathode ray tube (CRT)) connected to the computing system through a graphics port and graphics chipset, an alphanumeric input device 412 (e.g., a keyboard), a cursor control device 414 (e.g., a mouse), and a signal generation device 416 (e.g., a speaker).

The data storage device 418 may include a machine-accessible storage medium (or a computer-readable storage medium) 428 on which is stored one or more sets of instructions 422 (e.g., yield mechanism) embodying any one or more of the methodologies or functions described herein. The yield mechanism may also reside, completely or at least partially, within the main memory 404 (e.g., yield mechanism (instructions) 422) and/or within the processing device 402 (e.g., yield mechanism (processing logic) 426) during execution thereof by the computing system 400, the main memory 404 and the processing device 402 also constituting machine-readable storage media. Further, for example, the yield mechanism instructions 422 may be transmitted or received over a network 420 via the network interface device 408.

The machine-readable storage medium 428 may also be used to store the yield mechanism (instructions) 422 persistently. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Yield mechanism modules 432, components and other features described herein (for example in relation to FIG. 1) can be implemented as discrete hardware components or integrated in the functionality of hardware components such as ASICS, FPGAs, DSPs or similar devices. In addition, the modules 432 can be implemented as firmware or functional circuitry within hardware devices. Further, the modules 432 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "initiating", "issuing", "yielding", "committing", "completing", "notifying", "performing", "persisting", "detecting", "saving", "storing", "receiving", "communicating", "accessing", "providing", "facilitating" or the like, refer to the action and processes of a computing system, or similar electronic computing device, that manipulates and transforms data represented as physical (electronic) quantities within the computing system's registers and memories into other data similarly represented as physical quantities within the computing system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, magnetic-optical disks, ROMs, compact disk ROMs (CD-ROMs), RAMs, erasable programmable ROMs (EPROMs), electrically EPROMs (EEPROMs), magnetic or optical cards, or any type of media suitable for storing electronic instructions, each coupled to a computing system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computing system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., ROM, RAM, magnetic disk storage media, optical storage media, flash memory devices, etc.), a machine (e.g., computer) readable transmission medium (non-propagating electrical, optical, or acoustical signals), etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method comprising:

initiating, by a first input/output (I/O) scheduling entity executed by a processing device of a computer system, a first process issuing a first I/O operation to an I/O scheduler of the computer system;

issuing, by the first I/O scheduling entity, a commitment function to the I/O scheduler, the commitment function to commit the first I/O operation of the first process to a storage device of the computer system, wherein the first process is dependent on completion of a second process comprising a second I/O operation by a second I/O scheduling entity before the commitment function can commit a transaction comprising the first I/O operation to the storage device;

issuing, by the first I/O scheduling entity as part of the commitment function, a yield call to the I/O scheduler, wherein a yield component of the I/O scheduler triggers the issuing of the yield call by the first I/O scheduling entity as part of the commitment function in view of the dependency of the first process on the second process;

relinquishing, by the first I/O scheduling entity in response to the issuing of the yield call, resources of the I/O scheduler that are used by the first I/O scheduling entity to perform the first I/O operation, the resources of the I/O scheduler relinquished in order to yield the I/O scheduler to the second I/O scheduling entity, wherein the second I/O scheduling entity to initiate, in response to the yielding of the I/O scheduler, the second process that issues the second I/O operation to the I/O scheduler using the relinquished resources of the I/O scheduler from the first I/O scheduling entity in order to complete the transaction; and subsequent to the completion of the transaction, committing, by the I/O scheduler, the transaction to the storage device;

wherein the resources comprise processor time or bandwidth for the I/O scheduler assigned to the first I/O scheduling entity to perform the first I/O operation.

2. The method of claim 1, wherein the second I/O scheduling entity serves as a dependent I/O scheduling entity to the first I/O scheduling entity, wherein the second process serves as a dependent process to the first process.

3. The method of claim 1, wherein the first I/O scheduling entity comprises a software application running on the computer system.

4. The method of claim 1, wherein the second I/O scheduling entity is part of an operating system running on the computer system, the second I/O scheduling entity comprising a journal thread.

5. The method of claim 4, wherein the operating system comprises the I/O scheduler.

6. A system comprising:
a storage device;
a memory communicably coupled to the storage device, the memory to store instructions for a yielding input/output (I/O) scheduler; and
a processing device communicably coupled to the storage device and the memory, the processing device to:
initiate, by a first I/O scheduling entity executed by the processing device, a first process issuing a first I/O operation to the yielding I/O scheduler;
issue, by the first I/O scheduling entity, a commitment function to the I/O scheduler, the commitment function to commit the first I/O operation of the first process to the storage device, wherein the first process is dependent on completion of a second process comprising a second I/O operation by a second I/O scheduling entity before the commitment function can commit a transaction comprising the first I/O operation to the storage device;
issue, by the first I/O scheduling entity as part of the commitment function, a yield call to the I/O scheduler, wherein a yield component of the I/O scheduler triggers the issuing of the yield call by the first I/O scheduling entity as part of the commitment function in view of the dependency of the first process on the second process; and
relinquish, by the first I/O scheduling entity in response to the issuing of the yield call, resources of the I/O scheduler that are used by the first I/O scheduling entity to perform the first I/O operation, the resources of the I/O scheduler relinquished in order to yield the I/O scheduler to the second I/O scheduling entity, wherein the second I/O scheduling entity to initiate, in response to the yielding of the I/O scheduler, the second process that issues the second I/O operation to the I/O scheduler using the relinquished resources of the I/O scheduler from the first I/O scheduling entity in order to complete the transaction;

wherein the yielding I/O scheduler to, subsequent to the completion of the transaction, commit the transaction to the storage device;

wherein the resources comprise processor time or bandwidth for the I/O scheduler assigned to the first I/O scheduling entity to perform the first I/O operation.

7. The system of claim 6, wherein the second I/O scheduling entity serves as a dependent I/O scheduling entity to the first I/O scheduling entity, wherein the second process serves as a dependent process to the first process.

8. The system of claim 6, wherein the first I/O scheduling entity comprises a software application running on the computer system.

9. The system of claim 6, wherein the second I/O scheduling entity is part of an operating system running on the computer system, the second I/O scheduling entity comprising a journal thread.

10. The system of claim 9, wherein the operating system comprises the I/O scheduler.

11. A non-transitory machine-readable medium including instructions that, when executed by a processing device, cause the processing device to perform operations comprising:
initiating, by a first input/output (I/O) scheduling entity executed by the processing device of a computer system, a first process issuing a first I/O operation to an I/O scheduler of the computer system;
issuing, by the first I/O scheduling entity, a commitment function to the I/O scheduler, the commitment function to commit the first I/O operation of the first process to a storage device of the computer system, wherein the first process is dependent on completion of a second process comprising a second I/O operation by a second I/O scheduling entity before the commitment function can commit a transaction comprising the first I/O operation to the storage device;
issuing, by the first I/O scheduling entity as part of the commitment function, a yield call to the I/O scheduler, wherein a yield component of the I/O scheduler triggers the issuing of the yield call by the first I/O scheduling entity as part of the commitment function in view of the dependency of the first process on the second process;
relinquishing, by the first I/O scheduling entity in response to the issuing of the yield call, resources of the I/O scheduler that are used by the first I/O scheduling entity to perform the first I/O operation, the resources of the I/O scheduler relinquished in order to yield the I/O scheduler to the second I/O scheduling entity, wherein the second I/O scheduling entity to initiate, in response to the yielding of the I/O scheduler, the second process that issues the second I/O operation to the I/O scheduler using the relinquished resources of the I/O scheduler from the first I/O scheduling entity in order to complete the transaction; and
subsequent to the completion of the transaction, committing, by the I/O scheduler, the transaction to the storage device;
wherein the resources comprise processor time or bandwidth for the I/O scheduler assigned to the first I/O scheduling entity to perform the first I/O operation.

12. The non-transitory machine-readable medium of claim 11, wherein the second I/O scheduling entity serves as a dependent I/O scheduling entity to the first I/O scheduling entity, wherein the second process serves as a dependent process to the first process.

13. The non-transitory machine-readable medium of claim 11, wherein the first I/O scheduling entity comprises a software application running on the computer system.

14. The non-transitory machine-readable medium of claim 11, wherein the second I/O scheduling entity is part of an operating system running on the computer system, the second I/O scheduling entity comprising a journal thread.

15. The non-transitory machine-readable medium of claim 14, wherein the operating system comprises the I/O scheduler.

* * * * *